Figure 1:
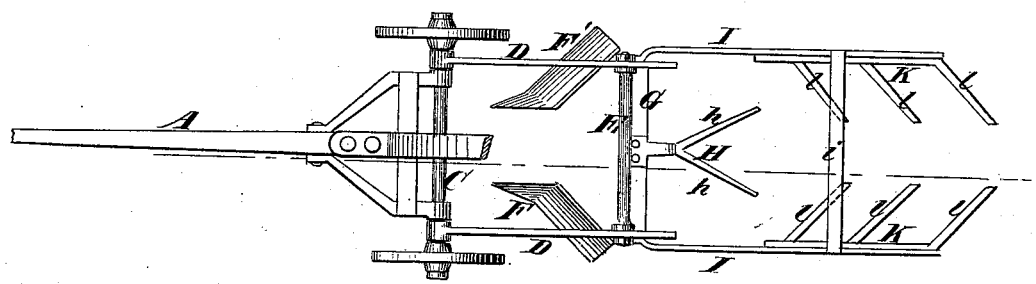

C. P. HIGGINS.
Potato-Digger.

No. 206,568.     Patented July 30, 1878.

Witnesses
John Becker
Fred. Haynes

Inventor
Campbell P. Higgins
by his Attorneys
Brown & Allen

UNITED STATES PATENT OFFICE.

CAMPBELL P. HIGGINS, OF EAST LINE, NEW YORK.

IMPROVEMENT IN POTATO-DIGGERS.

Specification forming part of Letters Patent No. 206,568, dated July 30, 1878; application filed June 19, 1878.

*To all whom it may concern:*

Be it known that I, CAMPBELL P. HIGGINS, of East Line, in the county of Saratoga and the State of New York, have invented an Improvement in Potato-Diggers; and I do hereby declare that the following is a full, clear, and exact description of the same, reference being had to the accompanying drawing, forming a part of this specification.

My invention relates to that class of potato-diggers designed to be worked by the draft of horses or other animals; and it has for its object the more effectual uprooting of the tubers of potatoes or other root-crops planted in rows, and the more thorough separation of the same from the adhering soil, than has hitherto been attained in such machines.

The invention consists in novel constructions and arrangements of parts, as hereinafter described, with reference to the drawing, in which—

Figure 2:
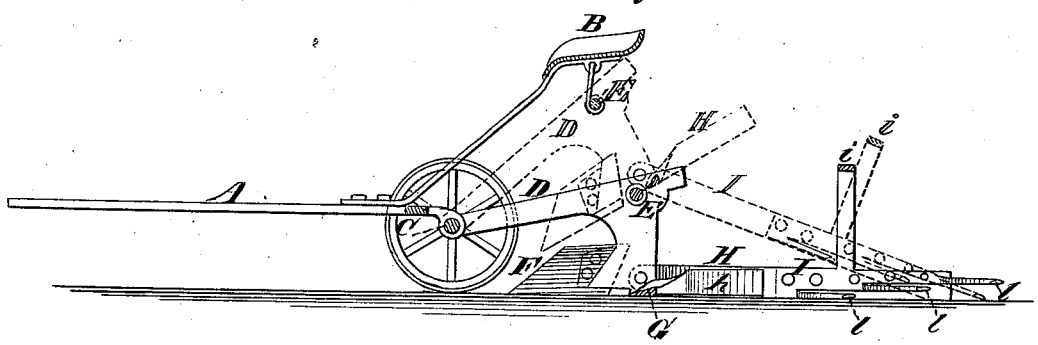

Figure 1 is a top or plan view of a machine constructed in accordance with my invention, having the seat and a part of the support for the same removed the better to show certain features of the machine. Fig. 2 is a side view of a machine constructed in accordance with my invention, the parts of the same being shown in two positions—one in full outline and the other in dotted outline.

A is a tongue or pole, by which the machine is drawn and guided by animals attached thereunto in the usual manner of such machines, the said tongue or pole being connected with wheels that support a seat, B, for the driver.

Pivoted to and extending rearward from the axle-tree C, upon which the said seat is supported, are plow-beams D; but I do not limit myself to the use of more than one such beam, as one may, by a slight modification of the machine, be made to answer the place of the two shown in the drawing; but I prefer to use two beams, as shown, the same being connected at the rear ends by a cross-bar, E. To the said beams are attached, in the usual or in any other approved manner, the plows F F'. The plow F is constructed to turn a furrow to the left, and the plow F' is constructed to turn a furrow to the right. The said plows are set at the proper distance apart to permit the passage between them of a row of potatoes, and in use they cut and turn away the soil on each side of such row, leaving a vertical-sided ridge of earth, in which the tubers are embedded.

Directly under the cross-bar E is a horizontal blade, G, placed on, or about on, a level with the bottoms of the aforesaid plows. The purpose of this blade is to cut under the ridge left by the plows F F'. In this way the tubers are left in a ridge of earth or soil which is severed from the compacted earth below. To the middle part of the said blade G is attached a breaker or plow, H, having two mold-boards, *h h*, set to divide the aforesaid ridge of earth as nearly as possible in the middle and longitudinally. The effect of this breaker or plow is to disintegrate the soil and loosen the roots from the said soil in such manner that they may be easily and thoroughly separated by the separators forming a part of the invention, and hereinafter described.

To the rear and lower parts of the plows F and F' is pivoted a frame, I, a portion, *i*, of which is elevated for convenience of the operator in grasping the same to raise the said frame, as hereinafter described.

To the inner sides of the rear portion of the frame are attached separators K, which may be separately made and fastened to the said frame, or may form a single piece with the said frame.

The prominent and essential feature of the separators, as shown, is fingers *l*, extending inwardly from the side bars of the said frame, and preferably inclined to the rearward; but I do not wish to confine myself to the precise separator herein described, as other forms may be made to answer the purpose. I prefer, however, the form herein shown and described.

The function of the said separators is to separate the loosened tubers from the disintegrated earth turned to the right and left by the breaker or plow H, and to push or shove the said tubers into the furrow left by the passage of the said breaker or plow. In this way I am able to more thoroughly and rapidly effect the digging of potatoes or other roots planted in rows than it can be done by any other machine for this purpose with which I am at present acquainted.

When the operator desires to move the machine about without operating the same, the plows F and F' are lifted, and the cross-bar E is engaged with a hook depending from the under side of the driver's seat, as shown in dotted outline in Fig. 2, and in turning the machine around the frame I and separators K may be lifted by the operator without getting out of his seat by reaching back and grasping the bar $i$.

I claim—

1. The combination, with plows F and F', of the horizontal blade G for cutting under the ridge left by the action of the said plows, substantially as and for the purpose described.

2. The combination, with the plows F and F', blade G, and breaker or plow H, of the separator frame and its extension $i$, said frame being pivoted at the rear of the said breaker for separating the roots from the disintegrated earth, substantially as and for the purpose specified.

C. P. HIGGINS.

Witnesses:
HENRY T. BROWN,
FRED. HAYNES.